United States Patent
Tian (10) Patent No.: US 9,958,899 B2
(45) Date of Patent: May 1, 2018

(54) ELECTRONIC DEVICE AND INFORMATION PROCESSING METHOD THEREOF

(71) Applicants: Beijing Lenovo Software Ltd., Beijing (CN); Lenovo (Beijing) Co., Ltd., Beijing (CN)

(72) Inventor: Ting Tian, Beijing (CN)

(73) Assignees: Beijing Lenovo Software Ltd., Beijing (CN); Lenovo (Beijing) Co., Ltd., Beijing (CN)

(*) Notice: Subject to any disclaimer, the term of this patent is extended or adjusted under 35 U.S.C. 154(b) by 143 days.

(21) Appl. No.: 14/092,309

(22) Filed: Nov. 27, 2013

(65) Prior Publication Data
US 2014/0145938 A1    May 29, 2014

(30) Foreign Application Priority Data
Nov. 27, 2012 (CN) .......................... 2012 1 0491018

(51) Int. Cl.
| G06F 3/01 | (2006.01) |
| G06F 1/16 | (2006.01) |
| G06F 1/32 | (2006.01) |
| G06F 3/0338 | (2013.01) |

(52) U.S. Cl.
CPC .......... G06F 1/1616 (2013.01); G06F 1/1677 (2013.01); G06F 1/3206 (2013.01); G06F 3/0338 (2013.01)

(58) Field of Classification Search
CPC ..................................... G06F 3/00; G06F 3/01
See application file for complete search history.

(56) References Cited

U.S. PATENT DOCUMENTS

| 7,061,536 B2 | 6/2006 | Cha |
| 7,107,084 B2* | 9/2006 | Duarte et al. ............... 455/575.3 |
| 7,215,538 B1* | 5/2007 | Chen et al. ............... 361/679.06 |

(Continued)

FOREIGN PATENT DOCUMENTS

| CN | 1349145 A | 5/2002 |
| CN | 102371069 A | 3/2012 |

OTHER PUBLICATIONS

Second Chinese Office Action regarding Application No. 201210491018.7 dated Mar. 21, 2017. English translation provided by http://globaldossier.uspto.gov.

(Continued)

*Primary Examiner* — Christopher E Leiby
(74) *Attorney, Agent, or Firm* — Harness, Dickey & Pierce, P.L.C.

(57) ABSTRACT

An electronic device and an information processing method thereof are provided. When a state of a relative position between a first body and a second body is an open state and a sensor is started, an initial angle between the first body and the second body that is formed through support of the connector is collected by the sensor, a variation between a first position of the first body relative to the second body and a second position to which the first body moves relative to the second body under an external force is collected by the sensor, and finally a display parameter is controlled according to the variation. Therefore, the solutions provided by the invention do not need an additional auxiliary apparatus such as a keypad/pedal thereby making the operation easier and more convenient for the operator.

15 Claims, 2 Drawing Sheets

(56) References Cited

U.S. PATENT DOCUMENTS

| | | | |
|---|---|---|---|
| 7,286,181 B2 | 10/2007 | Cha | |
| 7,679,890 B2* | 3/2010 | Yang | 361/679.05 |
| 2002/0044216 A1 | 4/2002 | Cha | |
| 2003/0140457 A1* | 7/2003 | Kida | G06F 1/1616 |
| | | | 16/342 |
| 2006/0128429 A1 | 6/2006 | Cha | |
| 2008/0238816 A1* | 10/2008 | Matsushita | 345/30 |
| 2012/0162889 A1* | 6/2012 | Han | 361/679.09 |
| 2013/0041219 A1* | 2/2013 | Hasegawa et al. | 600/109 |
| 2013/0076591 A1* | 3/2013 | Sirpal et al. | 345/1.3 |
| 2013/0222231 A1* | 8/2013 | Gardenfors | G06F 3/03 |
| | | | 345/156 |

OTHER PUBLICATIONS

First Chinese Office Action regarding Application No. 201210491018.7 dated Jul. 25, 2016. English translation provided by http://globaldossier.uspto.gov.

* cited by examiner

ELECTRONIC DEVICE AND INFORMATION PROCESSING METHOD THEREOF

CROSS REFERENCE TO RELATED APPLICATION

The present application claims the priority to Chinese Patent Application No. 201210491018.7, filed with the Chinese Patent Office on Nov. 27, 2012, entitled as "ELECTRONIC DEVICE AND INFORMATION PROCESSING METHOD THEREOF", the entire contents of which is incorporated herein by reference in its entirety.

BACKGROUND

Field of the Disclosure

This application relates to the technical field of an electronic device, and particularly to an electronic device and an information processing method thereof.

Background of the Technology

As widespread use of an electronic device, functions developed according to a gravity sensor in the electronic device are increasing. For example, for a tablet computer, directions in a game, such as need for speed, in the tablet computer are controlled by a gravity sensor. A user may change an inclined angle of the electronic device to control a motion sensing game. However, the electronic device in the prior art cannot implement all operations for the motion sensing game only by the gravity sensor, for example, acceleration/deceleration in the need for speed may be controlled only by pressing a touch screen, thus, real experience can not be realized. In addition, there is a control apparatus (such as a game pad) in the prior art, which has a pedal for controlling parameters in application, for example, controlling the acceleration/deceleration in the need for speed. However, the control apparatus has a large size and is not facilitated to be carried. Therefore, there is a need to provide an electronic device which can make the user truly feel an experience of pressing the pedal during operation and is facilitated to be carried.

SUMMARY

To solve the above technical problems, embodiments of this application provide an electronic device and an information processing method thereof, to solve a problem of complex operations in the existing operation control method. The technical solutions are described as follows.

An electronic device, including a processor, a sensor, a first body, a second body and a connector for connecting the first body and the second body, where the first body is movable relative to the second body, a state of a relative position between the first body and the second body includes an open state and a closed state, and the connector is adapted to adjust the relative position between the first body and the second body to make the relative position in the open state or the closed state;

the sensor is adapted to obtain a variation, wherein the variation represents an offset between a first position of the first body relative to the second body and a second position to which the first body moves relative to the second body under an external force if the state of the relative position between the first body and the second body is the open state; and the processor is adapted to: obtain a determination parameter if the state of the relative position between the first body and the second body is the open state, the determination parameter being adapted to determine whether to start the sensor; enable the sensor; obtain a variation by the sensor if it is determined that the determination parameter meets a predetermined condition; and control a display parameter of a controlled object and/or a display parameter of a display environment of the controlled object according to the variation.

Preferably, the variation is an angle variation, and the angle variation represents an angle offset between a first angle of the first body relative to the second body and a second angle of the first body relative to the second body after the first body moves under the external force if the state of the relative position between the first body and the second body is the open state.

Preferably, the connector includes a first rotational structure, a support body and a second rotational structure connected sequentially;

the first rotational structure is adapted to connect the first body and one end of the support body; and the second rotational structure is adapted to connect the second body and the other end of the support body.

Preferably, the first rotational structure is a spherical rotating shaft, and the second rotational structure is a rotating shaft.

Preferably, the electronic device further includes a damping apparatus arranged at the spherical rotating shaft and connected with the first body and the support body;

the damping apparatus is adapted to apply a force to the first body and the support body to restore an angle formed between the first body and the support body to a preset angle if the angle is not the preset angle and an application provided in the first body or the second body runs.

Preferably, the spherical rotating shaft is arranged at an edge position, a central point or a position between the edge position and the central point of the first body.

Preferably, the preset angle is an angle preset by an operator according to a requirement of the application.

Preferably, the preset angle is an angle of the first body relative to the support body if a relative movement of the first body moves relative to the support body stops for the first time during the state of the relative position being changed from the closed state to the open state.

Preferably, the preset angle is an angle formed between the first body and the support body when the application is started.

Preferably, the preset angle is an angle formed between the first body and the support body after a preset time period since the application is started.

Preferably, the sensor is arranged at the first body or the spherical rotating shaft.

Preferably, the connector is a rotating shaft.

Preferably, the electronic device further includes a damping apparatus arranged at the rotating shaft and connected with the first body and the second body;

the damping apparatus is adapted to apply a force to the first body and the second body to restore an angle formed between the first body and the second body to the preset angle if the angle is not the preset angle and an application runs.

Preferably, the preset angle is an angle preset by an operator according to a requirement on the application.

Preferably, the preset angle is an angle formed when a relative movement of the first body moves relative to the second body stops for the first time during the state of the relative position being changed from the closed state to the open state.

Preferably, the preset angle is an angle formed between the first body and the second body when the application is started.

Preferably, the preset angle is an angle formed between the first body and the second body after a preset time period since the application is started.

Preferably, the sensor is arranged at the first body.

Preferably, the processor is arranged at the first body, the second body or the connector.

An information processing method, which is applied in an electronic device, the electronic device including a processor, a sensor, a first body, a second body and a connector for connecting the first body and the second body, wherein the first body is movable relative to the second body, and a state of a relative position between the first body and the second body includes an open state and a closed state;

the information processing method includes:

obtaining a determination parameter if the state of the relative position between the first body and the second body is the open state, wherein the determination parameter is adapted to determine whether to start the sensor;

enabling the sensor if it is determined that the determination parameter meets a predetermined condition;

obtaining a variation by the sensor, wherein the variation represents an offset between a first position of the first body relative to the second body and a second position to which the first body moves relative to the second body under an external force if the state of the relative position between the first body and the second body is the open state; and controlling a display parameter of a controlled object and/or a display parameter of a display environment of the controlled object according to the variation.

Preferably, the variation is an angle variation, and the angle variation represents an angle offset between a first angle of the first body relative to the second body and a second angle of the first body relative to the second body after the first body moves under the external force if the state of the relative position between the first body and the second body is the open state.

Preferably, the information processing method further includes:

if an angle formed between the first body and the second body is not a preset angle and an application runs, applying a force to the first body and the second body to restore the angle to the preset angle.

Preferably, the preset angle is an angle preset by an operator according to a requirement on the application.

Preferably, the preset angle is an angle of the first body relative to the second body if a relative movement of the first body moves relative to the second body stops for the first time during the state of the relative position being changed from the closed state to the open state.

Preferably, the preset angle is an angle formed between the first body and the second body when the application is started.

Preferably, the preset angle is an angle formed between the first body and the support body after a preset time period since the application is started.

Preferably, the information processing method further includes:

obtaining a control instruction sent from the application; and moving, by the first body, relative to the second body according to the control instruction.

Compared with the prior art, the technical solutions provided by the embodiments have the following advantages and characteristics:

in the solutions provided by the invention, if the relative position state between the first body and the second body is the open state and the sensor is started, an initial angle between the first body and the second body that is formed through support of the connector is collected by the sensor, and after the first body moves relative to the second body, a variation between a first position of the first body relative to the second body and a second position to which the first body moves relative to the second body under an external force is collected by the sensor, and finally a display parameter is controlled according to the variation. Therefore, the solutions provided by the invention do not need an additional auxiliary apparatus such as a keypad/pedal, and only by changing the angle formed between the first body and the second body through the support of the connector, an operator can control the display parameter, thereby making the operation easier and more convenient for the operator.

BRIEF DESCRIPTION OF THE DRAWINGS

For more clearly illustrating the technical solutions in embodiments of this application or in the prior art, drawings referred to describe the embodiments or the prior art will be briefly described hereinafter. Apparently, the drawings in the following description are only several embodiments of this application, and for those skilled in the art, other drawings may be obtained based on these drawings without any creative work.

DETAILED DESCRIPTION

To give those skilled in the art a better understanding of the technical solutions in this application, in the following, the technical solutions in the embodiments of this application will be described clearly and completely in conjunction with the accompanying drawings in the embodiments of this application. Apparently, the described embodiments are just a part of embodiments of this application, rather than all embodiments. Based on the embodiments of this application, all other embodiments obtained by those skilled in the art without any creative work will fall within the scope of protection of this application.

An embodiment of the invention provides an electronic device, to solve the problem of complex operations in the operation control method in the prior art. The electronic device includes a processor, a sensor, a first body, a second body and a connector for connecting the first body and the second body, where the first body can move relative to the second body, a state of a relative position between the first body and the second body includes an open state and a closed state, the connector is used to adjust the relative position between the first body and the second body to make the relative position in the open state or the closed state; the sensor is used to obtain a variation, where the variation represents an offset between a first position of the first body relative to the second body and a second position to which the first body moves relative to the second body under an external force if the state of the relative position between the first body and the second body is the open state; and the processor is used to obtain a determination parameter if the state of the relative position between the first body and the second body is the open state, the determination parameter being used to determine whether to start the sensor; enable the sensor if it is determined that the determination parameter meets a predetermined condition; obtain a variation by the sensor; and control a display parameter of a controlled object and/or a display parameter of a display environment of the controlled object according to the variation.

In practice, if the state of the relative position between the first body and the second body is the open state, an angle between the first body and the second body that is formed by the first body and the second body may be 90 degrees, 180 degrees, 270 degrees or 360 degrees. The open state is a physical state formed objectively by the first body and the second body. When the state of the relative position between the first body and the second body is the open state, an action of pushing the power button used to start the electronic device can be taken as the determination parameter being used to determine whether to start the sensor. That is, the determination parameter is obtained if the power button is detected pushed. The sensor is started if the determination parameter is determined a determination parameter generated by pushing the power button.

When the state of the relative position between the first body and the second body is the open state and the sensor is started, an initial angle between the first body and the second body that is formed through support of the connector is collected by the sensor, and after the first body moves relative to the second body, a variation between a first position of the first body relative to the second body and a second position to which the first body moves relative to the second body under an external force is collected by the sensor; and finally a display parameter is controlled according to the variation. Therefore, the solutions provided by the invention do not need an additional keypad, and only by changing the angle of the first body relative to the second body through the support of the connector, an operator can control the display parameter, thereby making the operation easier and more convenient for the operator.

There are many ways for implementing the electronic device described above, detailed description will be given by specific embodiments hereinafter.

First Embodiment

Figure 1:
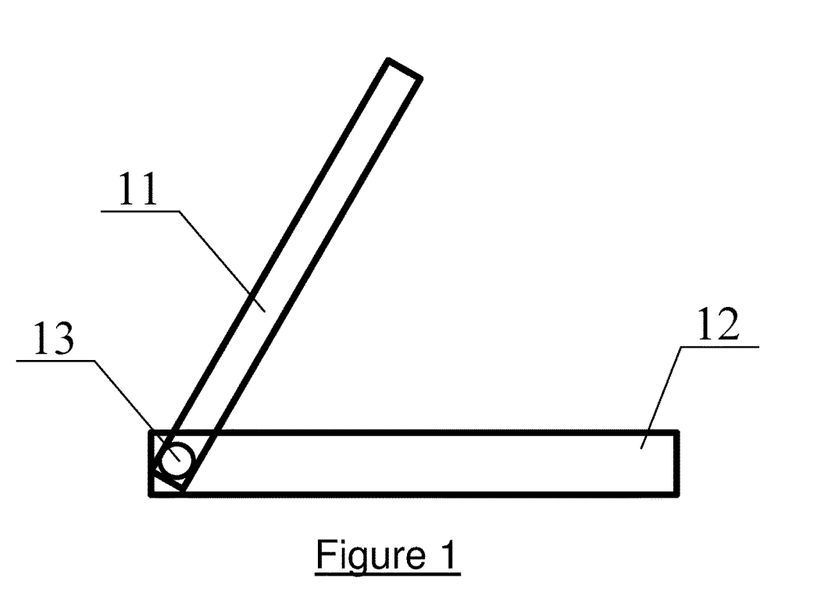
FIG. 1 is a schematic diagram showing an electronic device according to an embodiment of the invention.

Reference is made to FIG. 1 which shows an electronic device according to the invention, the electronic device includes a processor, a sensor, a first body 11, a second body 12 having the processor and a connector 13 for connecting the first body 11 and the second body 12, and an application is loaded into the electronic device. The connector 13 is used to adjust a relative position between the first body 11 and the second body 12 to make the relative position in an open state or a closed state. The processor is used to collect a first angle and a second angle of the first body 11 relative to the second body 12 if the state of the relative position between the first body 11 and the second body 12 is the open state, the first angle is an initial angle, and the second angle is an angle obtained after the first body 11 moves relative to the second body 12. The processor is used to determine an offset of the second angle relative to the first angle, and control a display parameter of a controlled object in the application and/or a display parameter of an environment of the controlled object according to the offset.

Both of the processor and the sensor are not illustrated in the figure, but those skilled in the art may rationally understand how the processor and the sensor are provided in the above components according to the description of this application. Further, the sensor may be arranged within the first body 11, and the processor may be arranged within the first body 11, the second body 12 or the connector 13. In addition, if the state of the relative position between the first body 11 and the second body 12 is the open state, the sensor needs to obtain the initial angle and the angle after a relative movement between the first body 11 and the second body 12, therefore it is required for the sensor to have a function of obtaining angle information. However, the sensor is not limited to a certain type, any sensor which is applicable for the invention to obtain angle information is within the scope of protection of the invention.

In the embodiment shown in FIG. 1, the connector 13 may be a rotating shaft, that is, a relative rotation between the first body 11 and the second body 12 may be implemented through the rotating shaft, to make the relative position in the open state or the closed state.

In the embodiment shown in FIG. 1, a relationship between the sensor and a display parameter of the application in the electronic device is pre-established. When the application runs and an operator exerts pressure to the first body 11, the sensor obtains an offset in the angle of the first body 11 relative to the second body 12, and sends the offset to the processor. Then the processor controls the display parameter of a controlled object in the application and/or the display parameter of an environment of the controlled object according to the offset.

Assuming that the application described above is a Racing Game, and if the Racing Game is run by the electronic device, it is needed for the user to pre-establish a relationship between the sensor and the Racing Game. First, in a set option of the Racing Game, the user may set that the racing car accelerates if the sensor inclines forward, and the larger the sensor's inclined angle, the faster the racing car's speed; and set that the racing car brakes if the sensor inclines backward. In practical display, since acceleration of the racing car is actually a case that an environment of the racing car changes, the processor controls a change in the angle received from the sensor, to control the speed of a change of the environment of the racing car, that is, to change the display parameter of the environment. By means of the above example of the racing car, it can be understood that a relationship between the sensor and the application needs to be pre-established, then the processor may change the display parameter of the controlled object in the application or the display parameter of the environment of the controlled object by the sensor, and may also change the display parameter of the controlled object and the display parameter of the environment of the controlled object at the same time by the sensor. Therefore, it is ensured that the operator can change a relative angle between the first body 11 and the second body 12 to control the application.

Of course, the application may not only be a game program, but also be other programs, such as a music program, a movie program, a drawing program or an office program. As long as the relationship between the application and the sensor is pre-established, the application can be controlled by the sensor. In other words, a corresponding relationship between the variation obtained from the sensor and the variation of the display parameter in the application is pre-stored.

In the embodiment shown in FIG. 1, the electronic device may further include a damping apparatus arranged at the rotating shaft and respectively connected with the first body 11 and the second body 12, which is not illustrated in the figure. The damping apparatus is used to apply a force to the first body 11 and the second body 12 to restore an angle formed by first body 11 and the second body 12 to a preset angle if the angle is not the preset angle and the application runs. During a process of using the electronic device by the user, an initial angle is needed to be preset, and if the first body 11 and the second body 12 are pressed to form different angles by the user, the electronic device determines whether the current angle is the preset angle. A force is applied to the first body 11 and the second body 12 to restore the angle formed between the first body and the second body to the preset angle by the damping apparatus if the application runs and it is determined that the angle is not the preset angle. The first body 11 and the second body 12 are at an angle pressed by the operator if an external force applied by the operator is greater than the restoring force; and the angle formed between the first body 11 and the second body 12 is restored to the preset angle if the external force applied by the operator is less than the restoring force or no external force is applied. Therefore, it is ensured that force feedback can be felt by the user throughout the process of pressing the first body of the electronic device, to make the user know what force is currently applied to the first body 11, thereby facilitating the user to perform adjustment.

The preset angle of the first body 11 relative to the second body 12 mentioned above is preset by the operator, and there are many ways to perform the presetting, which will be illustrated in the following by examples.

The first way is that the preset angle is preset by the operator according to a requirement on the application. For example, the application requires that the preset angle is within a certain range, and the application can not establish a relationship with the sensor if the preset angle is not within the range. In this way, the user may set the preset angle according to the requirement on the application. And later, no matter what degree of the angle formed between the first body 21 and the second body 12 is adjusted to, the angle will be finally restored to the preset angle set according to the requirement on the application under the action of the damping apparatus.

The second way is that the preset angle is preset as an angle formed if a relative movement of the first body 11 relative to the second body 12 stops for the first time during a state of a relative position being changed from the closed state to the open state. For example, the user open the first body 11 and the second body 12 from the close state to make them perform a relative movement, and in the process of performing the relative movement by the first body 11 and the second body 12, once the first body 11 is at rest relative to the second body 12, the angle of the first body 11 relative to the second body 12 is the preset angle. And later, no matter what degree of the angle formed between the first body 21 and the second body 12 is adjusted to, the angle will be finally restored to the angle formed if the relative movement stops for the first time under the action of the damping apparatus.

The third way is that the preset angle is preset as an angle of the first body 11 relative to the second body 12 when the application is started. For example, in a case where the current angle of the first body 11 relative to the second body 12 is 90 degrees, but the angle between the first body 11 and the second body 12 is adjusted to 120 degrees by the user, and at this time, one application is started by the user, then the preset angle is 120 degrees. And later, no matter what degree of the angle formed between the first body 21 and the second body 12 is adjusted to, the angle will be finally restored to 120 degrees under the action of the damping apparatus.

The fourth way is that the preset angle is preset as an angle of the first body 11 relative to the second body 12 after a preset time period since the application is started. For example, in a case where the current angle of the first body 11 relative to the second body 12 is 90 degrees, and at this time, one application is started by the user, and a preset time period is assumed to be 5 seconds, then the angle of the first body 11 relative to the second body 12 after 5 seconds is the preset angle. Assuming that the angle of the first body 11 relative to the second body 12 after 5 seconds is 120 degrees, then the preset angle is 120 degrees. And later, no matter what degree of the angle formed between the first body 21 and the second body 12 is adjusted to, the angle will be finally restored to 120 degrees under the action of the damping apparatus.

In the embodiment shown in FIG. 1, the structure of the electronic device is similar to a structure of an existing notebook computer. However, unlike the notebook computer, it is possible for the user to indirectly control the application in the electronic device by controlling the first body 11, thereby making it more convenient for the user to use.

Second Embodiment

Figure 2:
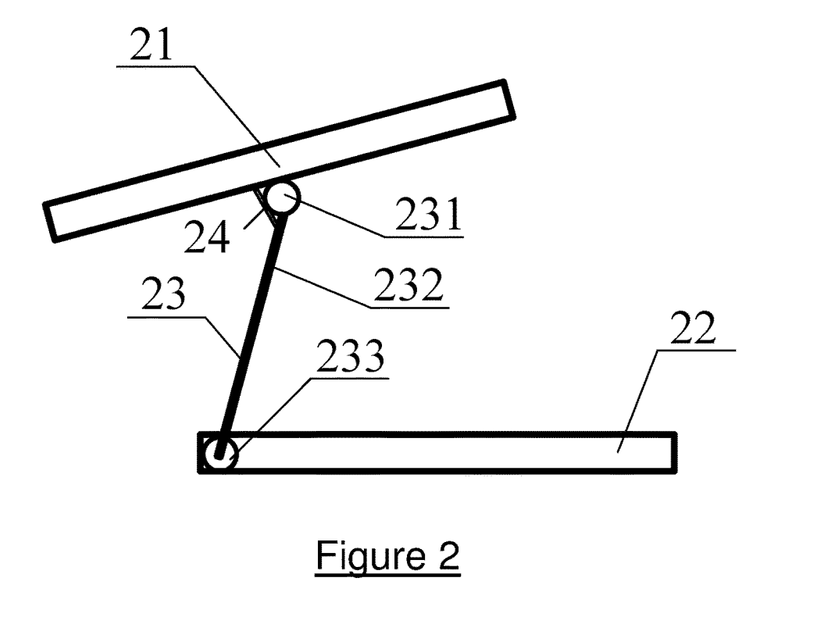
FIG. 2 is a schematic diagram showing another electronic device according to an embodiment of the invention.

Reference is made to FIG. 2 which shows another electronic device according to the invention, the electronic device includes a processor, a sensor, a first body 21, a second body 22 having the processor and a connector 23 for connecting the first body 21 and the second body 22, and an application is loaded into the electronic device. The connector 23 is used to adjust a relative position between the first body 21 and the second body 22 to make the relative position in an open state or a closed state. The processor is used to collect a first angle and a second angle of the first body 21 relative to the second body 22 if the state of the relative position between the first body 21 and the second body 22 is the open state, the first angle is an initial angle, and the second angle is an angle obtained after the first body 21 moves relative to the second body 22. The processor is used to determine an offset of the second angle relative to the first angle, and control a display parameter of a controlled object in the application and/or a display parameter of an environment of the controlled object according to the offset. The connector 23 includes a first rotational structure 231, a support body 232 and a second rotational structure 233 connected sequentially. The first rotational structure 231 is used to connect the first body 21 and one end of the support body 232. The second rotational structure 233 is used to connect the second body 22 and the other end of the support body 232. The connector 23 may put up the first body 21 to make both ends of the first body 21 separate from the second body 22, then the first body 21 may swing freely under support of the connector 23, thus, the operations on the first body 21 by the user become more convenient and easier and will not be limited by the second body 22.

Both of the processor and the sensor are not illustrated in the figure, but those skilled in the art may rationally understand how the processor and the sensor are provided in the above components according to the description of this application. Further, the sensor may be arranged within the first body 21 or the first rotational structure 231, and the processor may be arranged within the first body 21, the second body 22 or the connector 23. In addition, if the state of the relative position between the first body 21 and the second body 22 is the open state, the sensor needs to obtain the initial angle and the angle after a relative movement between the first body 21 and the second body 22, therefore it is required for the sensor to have an function of obtaining angle information. However, the sensor is not limited to a certain type, any sensor which is applicable for the invention to obtain angle information is within the scope of protection of the invention.

In the embodiment shown in FIG. 2, the first rotational structure 231 may adopt a spherical rotating shaft, and the second rotational structure 233 may adopt a rotating shaft. In this case, since the first body 21 is needed to be controlled by the user, and the spherical rotating shaft allows the first body 21 to incline at any angle, a pressure sensor may receive forces from different directions, thus there is no direction limitation for the user to use.

In the embodiment shown in FIG. 2, a relationship between the sensor and a display parameter of the application in the electronic device is pre-established. When the application runs and an operator exerts pressure to the first body 21, the sensor obtains an offset in the angle formed between the first body 21 and the second body 22, and sends the offset to the processor. Then the processor controls the display parameter of a controlled object in the application and/or the display parameter of an environment of the controlled object according to the offset.

Assuming that the application described above is a Racing Game, and if the Racing Game is run by the electronic device, it is needed for the user to pre-establish a relationship between the sensor and the Racing Game. First, in a set option of the Racing Game, the user may set that the racing car accelerates if the sensor inclines forward, and the larger the sensor's inclined angle, the faster the racing car's speed; and set that the racing car brakes if the sensor inclines backward. In practical display, since acceleration of the racing car is actually a case that an environment of the racing car changes, the processor controls a change in the angle received from the sensor to control the speed of a change of the environment of the racing car, that is, to change the display parameter of the environment. By means of the above example of the racing car, it can be understood that a relationship between the sensor and the application needs to be pre-established, then the processor may change the display parameter of the controlled object in the application or the display parameter of the environment of the controlled object by the sensor, and may also change the display parameter of the controlled object and the display parameter of the environment of the controlled object at the same time by the sensor. Therefore, it is ensured that the operator can change a relative angle between the first body 21 and the second body 22 to control the application.

Of course, the application may not only be a game program, but also be other programs, such as a music program, a movie program, a drawing program or an office program. As long as the relationship between the application and the sensor is pre-established, the application can be controlled by the sensor.

In the embodiment shown in FIG. 2, the electronic device may further include a damping apparatus 24 arranged at the spherical rotating shaft and respectively connected with the first body 21 and the support body 232. The damping apparatus 24 is used to apply a force to the first body 21 and the support body 232 to restore an angle formed between the first body and the second body to a preset angle if the angle is not the preset angle and the application runs. During a process of using the electronic device by the user, an initial angle is needed to be preset, and if the first body 21 and the support body 232 are pressed to form different angles by the user, the electronic device determines whether the current angle is the preset angle. A force is applied to the first body 21 and the support body 232 to restore the angle formed between the first body and the second body to the preset angle by the damping apparatus 24 if the application runs and it is determined that the angle is not the preset angle. The first body 21 and the support body 232 are at an angle pressed by the operator if an external force applied by the operator is greater than the restoring force; and then the angle formed between the first body 21 and the support body 232 is restored to the preset angle if the external force applied by the operator is less than the restoring force or no external force is applied. Therefore, it is ensured that force feedback can be felt by the user throughout the process of pressing the first body of the electronic device, to make the user know what force is currently applied to the first body 21, thereby facilitating the user to perform adjustment.

The preset angle of the first body 21 relative to the support body 232 mentioned above is preset by the operator, and there are many ways to perform the presetting, which will be illustrated in the following by examples.

The first way is that the preset angle is preset by the operator according to a requirement on the application. For example, the application requires that the preset angle is within a certain range, the application can not establish a relationship with the sensor if the preset angle is not within the range. In this way, the user may set the preset angle according to the requirement on the application. And later, no matter what degree of the angle formed between the first body 21 and the support body 232 is adjusted to, the angle will be finally restored to the preset angle set according to the requirement on the application under the action of the damping apparatus.

The second way is that the preset angle is preset as an angle formed if a relative movement of the first body 21 relative to the support body 232 stops for the first time during a state of a relative position being changed from the closed state to the open state. For example, the user open the first body 21 and the support body 232 from the close state to make them perform a relative movement, and in the process of performing the relative movement by the first body 21 and the support body 232, once the first body 21 is at rest relative to the support body 232, the angle of the first body 21 relative to the support body 232 is the preset angle. And later, no matter what degree of the angle formed between the first body 21 and the support body 232 is adjusted to, the angle will be finally restored to the angle formed if the relative movement stops for the first time under the action of the damping apparatus.

The third way is that the preset angle is preset as an angle formed between the first body 21 and the support body 232 when the application is started. For example, in a case where the current angle formed between the first body 21 and the support body 232 is 90 degrees, but the angle formed between the first body 21 and support body 232 is adjusted to 120 degrees by the user, and at this time, one application is started by the user, then the preset angle is 120 degrees. And later, no matter what degree of the angle formed between the first body 21 and the support body 232 is adjusted to, the angle will be finally restored to 120 degrees under the action of the damping apparatus.

The fourth way is that the preset angle is preset as an angle formed between the first body 21 and the support body 232 after a preset time period since the application is started. For example, in a case where the current angle formed between the first body 21 and the support body 232 is 90 degrees, and at this time, one application is started by the user; and a preset time period is assumed to be 5 seconds, then the angle formed between the first body 21 and the support body 232 after 5 seconds is the preset angle. Assuming that the angle formed between the first body 21 and the support body 232 after 5 seconds is 120 degrees, then the preset angle is 120 degrees. And later, no matter what degree of the angle formed between the first body 21 and the support body 232 is adjusted to, the angle will be finally restored to 120 degrees under the action of the damping apparatus.

In the embodiment shown in FIG. 2, the spherical rotating shaft is arranged at an edge position, a central point or a position between the edge position and the central point of the first body. The relative position between the spherical rotating shaft and the first body may be changed according to requirement of the user, thus, operations of the user in different situations is implemented.

Figure 3:
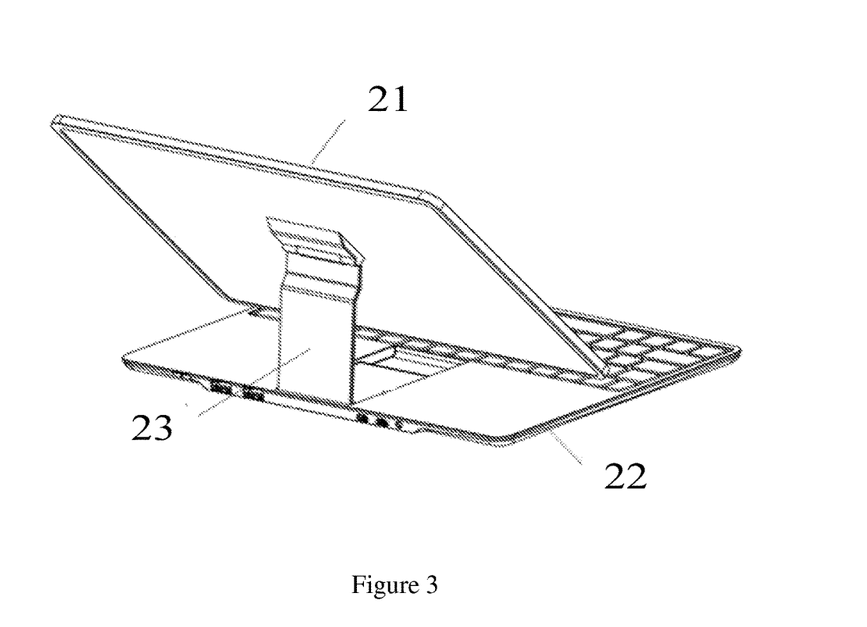
FIG. 3 is a picture of an electronic device according to an embodiment of the invention.

In the embodiment shown in FIG. 2, the structure of the electronic device is similar to a structure of an existing notebook computer. However, unlike the notebook computer, it is possible for the user to indirectly control the application in the electronic device by controlling the first body 21, thereby making it more convenient for the user to use. An implementation is illustrated in FIG. 3.

Third Embodiment

Figure 4:
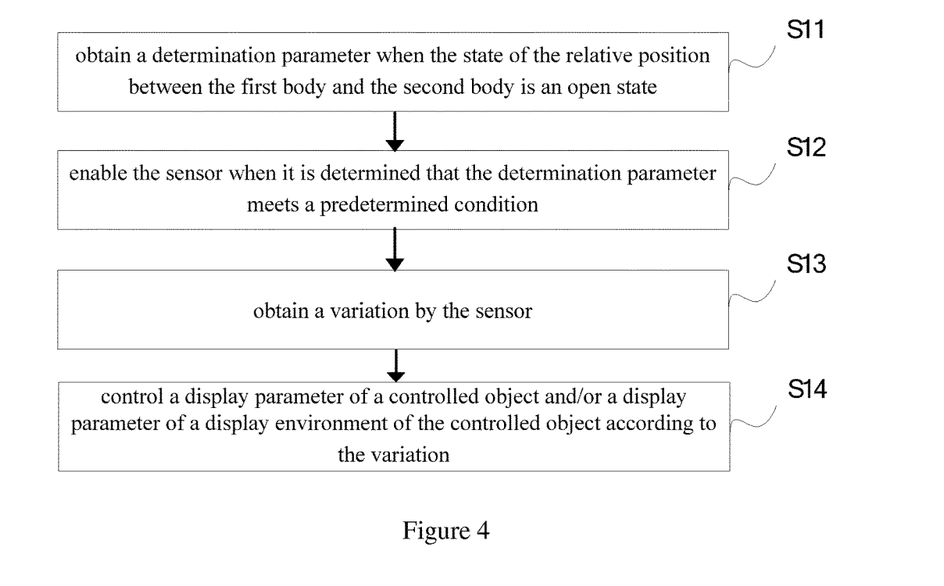
FIG. 4 is a flow chart of an information processing method of an electronic device according to an embodiment of the invention.

Reference is made to FIG. 4 which shows an information processing method according to an embodiment of the invention, the information processing method is applied in an electronic device. The electronic device includes a processor, a sensor, a first body, a second body and a connector for connecting the first body and the second body. The first body can move relative to the second body, and a state of a relative position between the first body and the second body includes an open state and a closed state.

The information processing method includes the following steps.

Step S11: obtaining a determination parameter if the state of the relative position between the first body and the second body is the open state, where the determination parameter is used to determine whether to start the sensor.

In practice, if the state of the relative position between the first body and the second body is the open state, an angle between the first body and the second body that is formed by the first body and the second body may be 90 degrees, 180 degrees, 270 degrees or 360 degrees. The open state is a physical state formed objectively by the first body and the second body. When the state of the relative position between the first body and the second body is the open state, an action of pushing the power button used to start the electronic device can be taken as the determination parameter being used to determine whether to start the sensor. That is, the determination parameter is obtained if the power button is detected pushed. The sensor is started if the determination parameter is determined a determination parameter generated by pushing the power button.

There are an open state and a closed state between the first body and the second body, and the determination parameter is only obtained in the open state in the embodiment. The determination parameter is used to determine whether to start the sensor, if it is determined that the determination parameter meets a condition, then the sensor is started, so that a variation may be obtained by the sensor; and if it is determined that the determination parameter does not meet the condition, then the sensor is not started.

Step S12: enabling the sensor if it is determined that the determination parameter meets a predetermined condition.

Step S13: obtaining a variation by the sensor, wherein the variation represents an offset between a first position of the first body relative to the second body and a second position to which the first body moves relative to the second body under an external force if the state of the relative position between the first body and the second body is the open state.

The variation may be an angle variation, and may also be other variations. In a case where the variation is an angle variation, the angle variation represents an angle offset between a first angle of the first body relative to the second body and a second angle formed between the first body and the second body after the first body moves under the external force if the state of the relative position between the first body and the second body is the open state.

Step S14: controlling a display parameter of a controlled object and/or a display parameter of a display environment of the controlled object according to the variation. In the embodiment shown in FIG. 4, the electronic device may control a display parameter of a controlled object in an application and/or a display parameter of a display environment of the controlled object according to the angle offset. Therefore, the solutions provided by the invention can render the operator to control the display parameter without an additional keypad, thereby making the operation easier and more convenient for the operator.

In the embodiment shown in FIG. 4, the method further includes the following steps: (1) obtaining a control instruction sent from the application; and (2) the first body moving relative to the second body according to the control instruction. Before performing the step (1), a relationship between the application and the first body and the second body is needed to be established, to ensure that the first body can move relative to the second body according to the instruction of the application under the control of the application.

The preset angle formed between the first body 11 and the second body 12 mentioned in the first embodiment and FIG. 1 is preset by the operator, and there are many ways to perform the presetting, which will be illustrated in the following by examples.

The first way is that the preset angle is preset by the operator according to a requirement on the application. For example, the application requires that the preset angle is within a certain range, and the application can not establish a relationship with the sensor if the preset angle is not within the range. In this way, the user may set the preset angle according to the requirements on the application. And later, no matter what degree of the angle formed between the first body 11 and the second body 12 is adjusted to, the angle will be finally restored to the preset angle set according to the requirement on the application under the action of a damping apparatus.

The second way is that the preset angle is preset as an angle formed if a relative movement of the first body 11 relative to the second body 12 stops for the first time during a state of a relative position being changed from the closed state to the open state. For example, the user open the first body 11 and the second body 12 from the close state to make them perform a relative movement, and in the process of performing the relative movement by the first body 11 and the second body 12, once the first body 11 is at rest relative to the second body 12, the angle formed between the first body 11 and the second body 12 is the preset angle. And later, no matter what degree of the angle formed between the first body 11 and the second body 12 is adjusted to, the angle will be finally restored to the angle formed if the relative movement stops for the first time under the action of the damping apparatus.

The third way is that the preset angle is preset as an angle formed between the first body 11 and the second body 12 when the application is started. For example, in a case where the current angle formed between the first body 11 and the second body 12 is 90 degrees, but the angle between the first body 11 and the second body 12 is adjusted to 120 degrees by the user, and at this time, one application is started by the user, then the preset angle is 120 degrees. And later, no matter what degree of the angle formed between the first body 11 and the second body 12 is adjusted to, the angle will be finally restored to 120 degrees under the action of the damping apparatus.

The fourth way is that the preset angle is preset as an angle formed between the first body 11 and the second body 12 after a preset time period since the application is started. For example, in a case where the current angle formed between the first body 11 and the second body 12 is 90 degrees, and at this time, one application is started by the user, and a preset time period is assumed to be 5 seconds, then the angle formed between the first body 11 and the second body 12 after 5 seconds is the preset angle. Assuming that the angle formed between the first body 11 and the second body 12 after 5 seconds is 120 degrees, then the preset angle is 120 degrees. And later, no matter what degree of the angle formed between the first body 11 and the second body 12 is adjusted to, the angle will be finally restored to 120 degrees under the action of the damping apparatus.

The preset angle formed between the first body 21 and the support body 232 mentioned in the second embodiment and FIG. 2 is preset by the operator, and there are many ways to perform the presetting, which will be illustrated in the following by examples.

The first way is that the preset angle is preset by the operator according to a requirement on the application. For example, the application requires that the preset angle is within a certain range, and the application can not establish a relationship with the sensor if the preset angle is not within the range. In this way, the user may set the preset angle according to the requirement on the application. And later, no matter what degree of the angle formed between the first body 21 and the support body 232 is adjusted to, the angle will be finally restored to the preset angle set according to the requirement on the application under the action of the damping apparatus.

The second way is that the preset angle is preset as an angle formed if a relative movement of the first body 21 relative to the support body 232 stops for the first time during a state of a relative position being changed from the closed state to the open state. For example, the user open the first body 21 and the support body 232 from the close state to make them perform a relative movement, and in the process of performing the relative movement by the first body 21 and the support body 232, once the first body 21 is at rest relative to the support body 232, the angle formed between the first body 21 and the support body 232 is the preset angle. And later, no matter what degree of the angle formed between the first body 21 and the support body 232 is adjusted to, the angle will be finally restored to the angle formed if the relative movement stops for the first time under the action of the damping apparatus.

The third way is that the preset angle is preset as an angle formed between the first body 21 and the support body 232 when the application is started. For example, in a case where the current angle formed between the first body 21 and the support body 232 is 90 degrees, but the angle formed between the first body 21 and the support body 232 is adjusted to 120 degrees by the user, and at this time, one application is started by the user, then the preset angle is 120 degrees. And later, no matter what degree of the angle formed between the first body 21 and the support body 232 is adjusted to, the angle will be finally restored to 120 degrees under the action of the damping apparatus.

The fourth way is that the preset angle is preset as an angle formed between the first body 21 and the support body 232 after a preset time period since the application is started. For example, in a case where the current angle formed between the first body 21 and the support body 232 is 90 degrees, and at this time, one application is started by the user; and a preset time period is assumed to be 5 seconds, then the angle formed between the first body 21 and the support body 232 after 5 seconds is the preset angle. Assuming that the angle formed between the first body 21 and the support body 232 after 5 seconds is 120 degrees, then the preset angle is 120 degrees. And later, no matter what degree of the angle formed between the first body 21 and the support body 232 is adjusted to, the angle will be finally restored to 120 degrees under the action of the damping apparatus.

It should be noted that, relational terms, such as first and second, herein are just used to distinguish one entity or operation from another entity or operation, which do not necessarily require or indicate that any of such actual relationship or sequence exists between these entities or operations. In addition, terms "comprise", "include" or any other variation thereof intends to be understood in a non-exclusive sense, so that a process, a method, an object or a device including a series of elements not only includes these elements, but also includes other elements not explicitly listed, or further includes elements inherent in the process, the method, the object or the device. In the absence of more restrictions, element defined by a sentence "includes a . . . " does not exclude that other same elements also exist in the process, the method, the object or the device including said element.

By the above description of the embodiments, those skilled in the art can clearly understand that the invention may be implemented by software and a necessary hardware platform, and may also be implemented only by hardware, but it is preferable for the invention to be implemented by software and a necessary hardware platform in many situations. Based on such understanding, all or a part of the contribution to the background art that is made by the invention may be embodied in a form of computer software product, the computer software product may be stored into a storage medium, such as a ROM/RAM, a magnetic disk, or an optical disk, and include several instructions for causing a computer (which may be a personal computer, a server, or a network device) to perform the method described in each embodiment or some parts of the embodiments of the invention.

The electronic device and the information processing method thereof provided by the invention are described above in detail, specific examples are used herein to illustrate the principle and embodiments of the invention, and the illustration of the above embodiments is only used to help understand the method and core concept of the invention. In addition, modifications to the specific embodiments and the application range can be made by those skilled in the art according to the concept of the invention. In summary, the content of the specification should not be interpreted as limiting the invention.

The invention claimed is:

1. An electronic device comprising: a processor, a sensor, a first body, a second body, a connector for connecting the first body and the second body, and a damping apparatus, wherein:

an application program is loaded into the electronic device;

the first body is movable relative to the second body;

a state of a relative position between the first body and the second body comprises an open state and a closed state;

the connector is adapted to adjust the relative position between the first body and the second body to make the relative position in the open state or the closed state, and the connector comprises a first rotational structure, a support body and a second rotational structure connected sequentially, the first rotational structure being adapted to connect the first body to a first end of the support body, and the second rotational structure being adapted to connect the second body to a second end of the support body;

the sensor is adapted to obtain a variation, the variation representing an offset between a first position of the first body relative to the second body and a second position to which the first body moves relative to the second body under an external force in response to the state of the relative position between the first body and the second body being the open state;

the damping apparatus is controlled by the application program to apply a force to the first body and the support body to restore an angle formed between the first body and the support body to a preset angle, wherein the angle formed between the first body and the support body is not equal to the preset angle, wherein the preset angle is within a predetermined range, when the angle formed between the first body and the support body is within the predetermined range, the application program is capable of establishing a relationship with the sensor, and when the angle formed between the first body and the support body is not within the predetermined range, the application program is not capable of establishing the relationship with the sensor, wherein when the angle formed between the first body and the support body is within the predetermined range, the application program is capable of obtaining the variation from the sensor, and when the angle formed between the first body and the support body is not within the predetermined range, the application program is not capable of obtaining the variation from the sensor; and the processor is adapted to: (i) obtain a determination parameter adapted to determine whether to start the sensor in response to the state of the relative position between the first body and the second body is the open state, (ii) enable the sensor in response to the determination parameter meeting a predetermined condition, (iii) obtain a variation by the sensor, and (iv) control a display parameter of a controlled object in the application program and/or a display parameter of a display environment of the controlled object in the application program by changing an angle formed between the first body and the second body, wherein the application program comprises a game program, a music program, a movie program, a drawing program, or an office program.

2. The electronic device according to claim 1, wherein the variation is an angle variation, and the angle variation represents an angle offset between a first angle of the first body relative to the second body and a second angle of the first body relative to the second body after the first body moves under the external force if the state of the relative position between the first body and the second body is the open state.

3. The electronic device according to claim 1, wherein the first rotational structure is a spherical rotating shaft, and the second rotational structure is a rotating shaft.

4. The electronic device according to claim 3, wherein the spherical rotating shaft is arranged at an edge position, a central point or a position between the edge position and the central point of the first body.

5. The electronic device according to claim 1, wherein, the preset angle is an angle of the first body relative to the support body when a relative movement of the first body relative to the support body stops for a first time during the state of the relative position being changed from the closed state to the open state.

6. The electronic device according to claim 1, wherein the sensor is arranged at the first body or a spherical rotating shaft.

7. The electronic device according to claim 2 wherein the connector is a rotating shaft.

8. The electronic device according to claim 1, wherein the preset angle is an angle formed between the first body and the support body when the application program is started.

9. The electronic device according to claim 1, wherein the preset angle is an angle formed between the first body and the support body after the application program is started for a preset time period.

10. The electronic device according to claim 1, wherein when the angle formed between the first body and the support body is within the predetermined range, the application program is capable of obtaining the variation from the sensor, and when the angle formed between the first body and the support body is not within the predetermined range, the application program is not capable of obtaining the variation from the sensor.

11. An information processing method, which is applied in an electronic device, the electronic device including a processor, a sensor, a first body, a second body, a connector for connecting the first body and the second body, and a damping apparatus, wherein an application program is loaded into the electronic device, the first body is movable relative to the second body, a state of a relative position between the first body and the second body comprises an open state and a closed state and the connector comprises a first rotational structure, a support body and a second rotational structure connected sequentially, the first rotational structure being adapted to connect the first body to a first end of the support body, and the second rotational structure being adapted to connect the second body to a second end of the support body;

the information processing method comprising:

obtaining a determination parameter in response to the state of the relative position between the first body and the second body being the open state, wherein the determination parameter is adapted to determine whether to start the sensor;

enabling the sensor in response to the determination parameter meeting a predetermined condition;

obtaining a variation by the sensor, wherein the variation represents an offset between a first position of the first body relative to the second body and a second position to which the first body moves relative to the second body under an external force when the state of the relative position between the first body and the second body is the open state;

controlling a display parameter of a controlled object in the application program and/or a display parameter of a display environment of the controlled object in the application program by changing an angle formed between the first body and the second body, wherein the application program comprises a game program, a music program, movie program, a drawing program, or an office program; and wherein the application program controls applying a force to the first body and the support body to restore an angle formed between the first body and the support body to a preset angle, wherein the angle formed between the first body and the support body is not equal to the preset angle, wherein the preset angle is within a predetermined range, when the angle formed between the first body and the support body is within the predetermined range, the application program is capable of establishing a relationship with the sensor, and when the angle formed between the first body and the support body is not within the predetermined range, the application program is not capable of establishing the relationship with the sensor, wherein when the angle formed between the first body and the support body is within the predetermined range, the application program is capable of obtaining the variation from the sensor, and when the angle formed between the first body and the support body is not within the predetermined range, the application program is not capable of obtaining the variation from the sensor.

12. The information processing method according to claim 11, wherein the variation is an angle variation, and the angle variation represents an angle offset between a first angle of the first body relative to the second body and a second angle of the first body relative to the second body after the first body moves under the external force if the state of the relative position between the first body and the second body is the open state.

13. The information processing method according to claim 11, wherein,
the preset angle is an angle of the first body relative to the support body when a relative movement of the first body relative to the support body stops for a first time during the state of the relative position being changed from the closed state to the open state.

14. The information processing method according to claim 13, wherein, in a case that the preset angle is an angle of the first body relative to the second body when a relative movement of the first body moves relative to the second body stops for the first time during the state of the relative position being changed from the closed state to the open state, the method further comprises:
obtaining a control instruction sent from the application program; and
moving, by the first body, relative to the second body according to the control instruction.

15. An electronic device comprising:
a processor;
a non-transitory computer-readable medium storing an application program for execution on the processor;
a first body;
a second body;
a damping apparatus configured to selectively apply a force to the first body relative to the second body to restore the first body to a preset position;
a connector configured to allow the first body to rotate from a closed state to an open state with respect to the second body, wherein the connector comprises a first rotational structure, a support body and a second rotational structure connected sequentially, the first rotational structure being adapted to connect the first body to a first end of the support body, and the second rotational structure being adapted to connect the second body to a second end of the support body; and
a sensor configured to, while the first body is in the open state, selectively obtain an angular variation, wherein the angular variation represents an offset between a preset angle of the first body relative to the second body and a second angle of the first body relative to the second body, the first body moving from the preset angle to the second angle in response to an external force applied by a user of the electronic device,
wherein the non-transitory computer-readable medium includes instructions that:
obtain a determination parameter from the user,
enable the sensor in response to the determination parameter meeting a predetermined condition,
obtain the angular variation from the sensor, and
according to the angular variation, control a display parameter of at least one of (i) a controlled object in the application program and (ii) a display parameter of a display environment of the controlled object in the application program,
wherein the application program comprises a game program, a music program, a movie program, a drawing program, or an office program; and
wherein the application program controls applying a force to the first body and the support body to restore an angle formed between the first body and the support body to a preset angle, wherein the angle formed between the first body and the support body is not equal to the preset angle, wherein the preset angle is within a predetermined range, when the angle formed between the first body and the support body is within the predetermined range, the application program is capable of establishing a relationship with the sensor, and when the angle formed between the first body and the support body is not within the predetermined range, the application program is not capable of establishing the relationship with the sensor, wherein when the angle formed between the first body and the support body is within the predetermined range, the application program is capable of obtaining the variation from the sensor, and when the angle formed between the first body and the support body is not within the predetermined range, the application program is not capable of obtaining the variation from the sensor.

* * * * *